Sept. 13, 1949.  R. W. FORT  2,481,652
SEED HARVESTER
Filed July 25, 1947
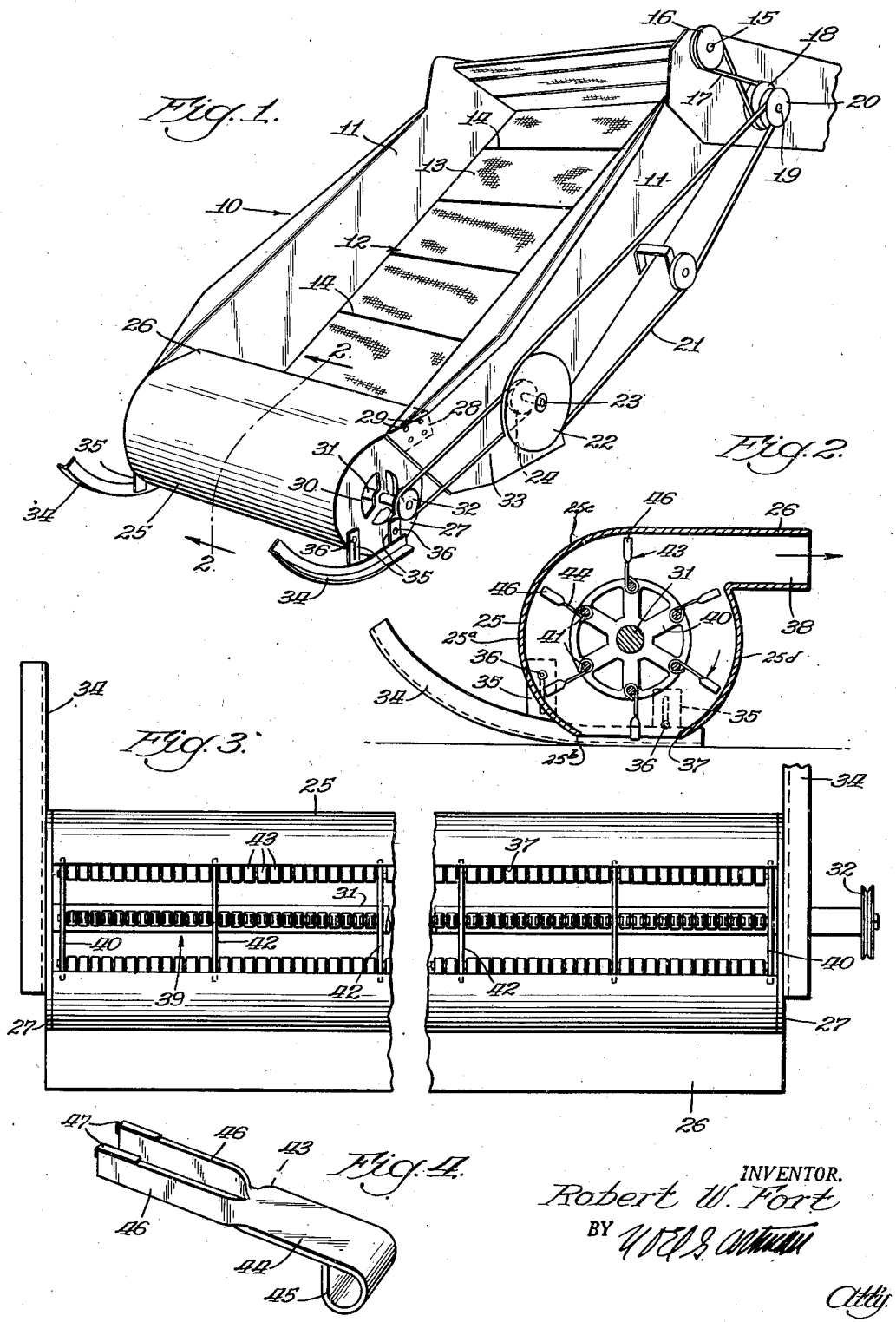
INVENTOR.
Robert W. Fort
BY
Atty.

Patented Sept. 13, 1949

2,481,652

UNITED STATES PATENT OFFICE 2,481,652

SEED HARVESTER

Robert W. Fort, Colby, Kans.

Application July 25, 1947, Serial No. 763,640

19 Claims. (Cl. 56—126)

The invention relates to a harvester and more particularly to a harvester of the type adapted to harvest the seed of grass or other vegetation borne by the soil close to the ground.

In its more specific aspects the invention relates to a machine that differs from the usual type of harvester that cuts standing crops, the present machine operating in a manner to strip the seed from the vegetation and to leave a sufficient stand to prevent soil and wind erosion. The invention relates primarily to a harvester for harvesting buffalo grass seed and incorporates means that will strip seed from standing plants and that will pick up and recover such seed from the ground surface after having been shattered from the plant, such means being so designed as to drive the seed upwardly and forwardly and then rearwardly for the purpose of discharging the seed onto a platform elevator or conveyor for ultimate delivery to threshing mechanism. The means for gathering the seed embodies also means for creating an air blast for the purpose of facilitating discharge of the harvested seed to the elevator or conveyor or other similar feeder leading to the threshing cylinder or the like.

Machines of the general type referred to have been heretofore known as involving means for gathering seed and separate and remote means for creating a low-pressure area adjacent the gathering means for the purpose of discharging the seed toward a path leading to a threshing mechanism. Such machines are characterized by several disadvantages inherent in the fundamental construction thereof; for example, the means for creating a low-pressure area or vacuum must necessarily be constructed of such size and capacity as to render the cost of the entire machine prohibitive. Further, such construction requires independent driving mechanism for the gathering means and the fan or blower. In general, it may be said that prior constructions are characterized by a design requiring that the machine be constructed especially for the purpose of gathering seed.

The present invention contemples and has for a principal object the provision of mechanism combining gathering and blower means of a simple and compact design. An important object of the invention is to provide the mechanism in such manner that it may be utilized as an attachment for existing meachines of the harvester-thresher or combine types. Other objects of importance reside in the provision of: an improved stripper member or tooth incorporating a harvesting portion and an air-blast-creating portion; an improved stripper tooth embodying a hardened wear surface or surfaces; the arrangement of a plurality of series of such teeth in such a manner that the blast-creating surfaces thereof provide in effect a fan blade of substantial area; means for carrying and enclosing the gathering and blowing means including a cylinder or drum having a material-intake opening and a material-discharge opening; and a design that is characterized by economy and simplicity of construction and that will operate successfully for long periods without repair or adjustment.

The foregoing and other important objects and desirable features of the invention will appear as the following detailed description progresses in connection with the illustration of a preferred embodiment of the invention as shown in the accompanying sheet of drawings in which:

Fig. 1 is a perspective view showing the invention as embodies in an attachment for a combine for a well known type, only the elevator or feeder of such combine being illustrated;

Fig. 2 is an enlarged transverse sectional view taken substantially along the line 2—2 of Fig. 1;

Fig. 3 is a bottom view of the cylinder or drum, showing the stripper mechanism as viewed through the intake opening of the cylinder or drum; and Fig. 4 is an enlarged perspective view of one of the stripper teeth.

The mechanism shown herein is of a preferred design and construction and has certain characteristics that are peculiar to the particular arrangement illustrated and described. It will be understood, of course, that other adaptations of this design and construction may be provided without departing from the fundamental principles of the invention. The present disclosure should therefore be taken as illustrative and not limiting.

The reference numeral 10 in Fig. 1 refers generally to the feeder or platform construction of a combine of a well known type. The platform includes transversely spaced side shields 11 cross connected at their lower ends by an inclined bottom (not shown) and including an endless conveyor 12 and a screen 13 above and parallel to the bottom, the conveyor 12 including a plurality of transverse slats 14 that travel upwardly over the screen 13 and thence downwardly over the bottom of the feeder. This construction is generally conventional and forms no part of the present invention, being illustrated only for the purpose of facilitating an understanding of the construction, features, and use of the invention.

The particular type of combine illustrated may be of the type in which the source of driving power is from a ground wheel or from an internal combustion engine, the drive being carried ultimately through a shaft 15 which carries a pulley 16 by means of which and an endless belt 17 the drive is carried to a pulley 18 on a shaft 19 that is parallel to the shaft 15. The shaft 19 carries the upper end of the conveyor 12 and further has fixed thereto a pulley 20 about which is trained an endless belt 21 which extends along the left-hand (determined according to the direction of travel of the combine) side shield 11 of the feeder 10. This belt is trained about a pulley 22 fixed to a rotatable shaft 23 extending transversely across the feeder 10 and having keyed or otherise fixed thereto for rotation therewith a smaller pulley 24.

The construction thus far described is conventional and the driving mechanism provides means for driving the sickle or header mechanism provided on the machine when used as a combine for the combining of grain. According to the present invention this header mechanism may be removed and be replaced by means for harvesting grass seed.

The type of grass-seed-harvesting mechanism chosen for the purposes of illustrating the present invention comprises an elongated hollow cylinder or drum 25 preferably constructed of sheet metal and disposed transversely across the lower front end of the feeder 10. The drum includes a rearwardly extending tangential portion 26 and is closed at opposite ends by end walls 27 having rearwardly extending portions 28 (only one of which is shown) providing side walls for the rearwardly extending portion 26. Each portion 28 is provided with a plurality of openings for the purpose of receiving bolts 29 by means of which the drum 25 is connected to the feeder 10. The bolts 29 provide means by which the drum 25 may be readily attached to and detached from the feeder 10, thereby permitting the use of the combine either with or without the seed harvesting mechanism, depending upon the type of crop to be harvested.

Each end wall of the drum 25 is provided with a spoked opening 30, the hub of the spokes providing a bearing for journaling a transverse rotary element or shaft 31. The shaft extends axially through the drum 25 and projects at the left-hand end thereof, at which point the shaft has keyed thereto a pulley 32. An endless belt 33 is trained about the pulley 32 and about the pulley 24 on the shaft 23 previously referred to. In this manner power from the shaft 15 is transmitted through the belts 17, 21 and 33 to rotate the shaft 31.

The drum 25 is provided with means for supporting the drum for travel over the ground as the drum moves with the combine. This means preferably takes the form of a pair of longitudinally extending transversely spaced runners 34 adjustably secured respectively to the end walls 27 of the drum by means of brackets 35 and bolts 36. The adjustment is provided for the purpose of varying the height of the drum with respect to the ground surface. The drum is provided at its bottom portion with an elongated preferably rectangular opening 37 by means of which the grass or other crop is taken into the interior of the drum to be harvested. The rearwardly extending tangential portion 26 provides a discharge opening 38 (Fig. 2) leading rearwardly to the conveyor 12 and thus communicating the interior of the drum 25 with the feeder 10, the conveyor providing means for receiving harvested seed discharged through the opening 38.

The curved front wall 25a of the casing 25 has a lower edge 25b bordering the front edge of the opening 37, and in Fig. 2 it can be seen that this curved front wall leads first forwardly and upwardly from said edge 25b and then upwardly and rearwardly with a continuing portion 25c thereof. A rear wall 25d is disposed rearwardly of the opening 37.

The rotary shaft 31 provides part of a rotary cage structure indicated generally by the numeral 39. This structure includes (Figs. 2 and 3) at least a pair of end members or spiders 40 spaced transversely apart, one at each end of the shaft 31. These spiders carry a plurality of circumferentially spaced supports or rods 41. Intermediate portions of the rod 41 pass through reinforcing rings 42 spaced axially of the shaft 31 and provided for the purpose of keeping the rods from springing out when the cage structure 39 is rotated at high speeds. The construction described is preferred; although, it may be replaced by any other suitable arrangement.

Each rod 41 carries thereon a series of closely spaced elements in the form of stripper teeth designated generally by the numeral 43. These teeth are swingably carried by the rods in such manner that they will stand out by the action of centrifugal force as the cage structure 39 is rotated (Fig. 2). A stripper tooth 43 is shown by itself on an enlarged scale in perspective in Fig. 4. The tooth comprises an elongated body provided of relatively broad flat metal having a fan portion 44 terminating in a looped end 45 and having its other end portion provided as a pair of transversely spaced tines or fingers 46. The looped end 45 loosely fits the rod 41 and provides means for pivoting the tooth to the rod. The tines 46 are preferably formed by splitting the elongated body of the tooth substantially midway of its length and then twisting the split portions to form tines lying in respective planes normal to the plane of the broad flat fan portion 44 and extending endwise of the elongated body from the fan portion. The leading and terminal edges of the tines are preferably provided as hardened tips 47, metal being added thereto as by welding. Such tips may be omitted in the event that the tooth itself is sufficiently hard to withstand wear, or such tips may be provided by any suitable method in the event that the tooth is more economically constructed of a softer and tougher metal. The split in the body that provides the tines 46 extends for substantially half the length of the body and the transverse spacing of the tines is such that the outermost sides thereof are within the confines of the transverse dimension of the broad surfaced portion 44.

When the teeth 43 are assembled on the rods 41, the broad surfaces of the portions 44 are in transverse alinement and parallel to the rods; and the tines 46 are transverse to the rods. The spacing between the teeth is held to a minimum consistent with free movement of the teeth so that, during rotation of the cage structure 39, the portions 44 of the teeth effect a blade or blower element of substantial transverse extent and of substantial area transverse to the direction of rotation of the cage. The terminal ends of the tines 46 travel in close proximity to the interior cylindrical surface of the drum 25 and also operate relatively close to the ground to harvest or gather seed from the crop that extends through the intake opening 37 of the drum.

*Operation*

In the use and operation of the seed harvesting mechanism either as part of a harvester or as an attachment for a harvester or combine, the drum 25 is positioned as aforesaid so that the intake opening 37 is in proximity to the ground and so that the discharge opening 38 is disposed so as to communicate the interior of the drum 25 with a feeder or other means for receiving the harvested seed. The cage structure 39 is rotated in a clockwise direction (as viewed in Fig. 2) at a sufficiently high rate of speed to cause the teeth 43 to stand outwardly and to engage the crop through the intake opening 37. The proximity of the teeth 43 to the ground and the speed of travel thereof insures that the teeth strip a commercially acceptable percentage of the seed (together with hulls containing the same and some plant stems) from the plants and also pick up seed from the ground, the teeth in effect brushing the seed forwardly and cooperating with the forward portion of the cylindrical drum wall for casting the seed upwardly and then backwardly through the discharge opening 38 to the conveyor 12. This upward and rearward movement of the seed while in the drum is believed to be expedited by the centrifugal whirling of air at a speed intensified by the broad tooth portions 44. Such air sweeping upwardly along the front portion of the cylindrical drum wall is discharged rearwardly through the passage 38 and carries seed therewith. Air thus discharged from the drum is replaced by ambient air rushing inwardly through the end openings 30. By limiting the width of the bottom grass-receiving opening circumferentially of the drum, the edges of such opening are disposed sufficiently close to the ground to materially limit escape of the centrifugally whirled air through this opening and minimize disturbance or diminution of the desired grass and seed bearing air current sweeping upwardly along the front portion of the cylindrical wall.

The combined action of the stripping and blower means has proven very effective for taking the seed and seed-bearing grass in through the opening 37 and for discharging this material through the opening 38. Since the teeth 43 travel at a high rate of speed, they slash and sever a high percentage of the seed-bearing portions of the grass stems in the process of stripping the seed from the plants, and the teeth operate in rapid succession to drive this stripped material upwardly and forwardly within the interior of the drum. Successive striking action of the teeth on the severed material, plus the swirl of air within the drum created by the broad surfaced portions 44 on the teeth enable the mechanism to deliver the material effectually to the conveyor 12 of the feeder 10. The mechanism provides in effect a combined stripper and fan and has several inherent advantages over prior constructions in which stripper mechanism and suction mechanism are provided separately. It is an important feature of the invention that the combined stripper and blower mechanism is provided simply by the series of teeth 43, each of which has the broad surfaced portion 44 and the stripper tines 46.

It will be apparent that the teeth 46 will tend to gather considerable foreign material, such as dirt, grass, and other objects that happen to be lying in the field. It is for this reason, among others, that the teeth 43 must be constructed of relatively tough metal, having at least the end portions thereof hardened as a 47. The harvested seed and other extraneous material delivered through the discharge opening 38 of the drum to the conveyor 12 of the feeder 10 will be moved upwardly by the transverse slats 14 of the conveyor over the screen 13. Fine seed and dirt will be sifted through the screen 13 and will fall upon the bottom of the feeder and will ultimately be returned by the lower run of the conveyor to the ground at a point rearwardly of the drum 25 so that it will not be picked up again. As stated above, the arrangement of the screen 13 in connection with the slatted conveyor 12 is of a generally conventional construction and forms no part of the present invention. The harvested seed could as well be delivered to any other type of receiving means and it is not intended that the scope of the invention be limited to the use of the stripping and blower means with a feeder of the type shown.

Many other modifications and alterations may be made in the preferred construction illustrated and described. It is likewise not intended that the invention be limited to the precise details of construction that make up the mechanism and its components.

What is claimed is:

1. For use with a harvester having a platform structure and means for receiving harvested material: a harvesting attachment comprising, an elongated generally cylindrical drum positionable transversely to and in front of the platform structure and including an elongated open bottom providing communication between the interior of the drum and ground-borne material to be harvested; means for connecting the drum to the platform structure; ground-engaging means on the drum including runners for carrying the drum over the ground; a rotary element extending axially through the drum and journaled therein; means for rotating the element; said drum having air intake openings respectively in the ends thereof and also having a discharge opening leading generally tangential therefrom for discharging to the material-receiving means of the harvester; and means carried by the rotary element for rotation therewith within the drum for harvesting material from the ground and for discharging such material through the discharge opening in the drum to the material-receiving means of the harvester, including a plurality of flail-like members swingably connected to the rotary element in axially spaced relation within the drum, and extendible generally radially outwardly from the axis of the rotary element as said element is rotated, certain of said members including portions for harvesting ground-borne material through the open bottom in the drum, and other portions generally transverse to the direction of rotation of the rotary element and providing fan means for creating an air blast within the drum and directed through the discharge opening.

2. For use with a harvester having a platform structure and means for receiving harvested material: a harvesting attachment comprising, an elongated generally cylindrical drum positionable transversely to the platform structure and having a bottom opening providing communication between the interior of the drum and ground-borne material to be harvested; means for connecting the drum to the platform structure; ground-engaging means on the drum for carrying the drum over the ground; a rotary element extending axially through the drum and journaled therein; means for rotating the element; the drum having air intake opening means apart from the aforesaid bottom opening and also having a discharge opening for discharge to the material-receiving means of the harvester; and means carried by the rotary element for rotation therewith within the drum for harvesting material from the ground and for discharging such material through the discharge opening in the drum to the material-receiving means of the harvester, including a plurality of members connected to the rotary element in axially spaced relation within the drum, certain of said members including portions for harvesting ground-borne material through the first mentioned opening in the drum, and other portions generally transverse to the direction of rotation of the rotary element and providing fan means for creating an air blast within the drum and directed through the discharge opening.

3. For use with a harvester having a platform structure and means for receiving harvested material: a harvesting attachment comprising, a generally cylindrical drum positionable transversely to the platform structure and having a bottom opening through which the interior of the drum communicates with material to be harvested; means for connecting the drum to the platform structure; a rotary element extending axially through the drum and journaled therein; means for rotating the element; the drum having a discharge opening separate from and spaced circumferentially of the drum from said bottom opening and disposed for discharge to the material-receiving means of the harvester; and means carried by the rotary element for rotation therewith within the drum for harvesting material from the ground through said bottom opening and for discharging such material through the discharge opening in the drum to the material-receiving means of the harvester, including a plurality of members connected to the rotary element, certain of said members including portions for harvesting material through the bottom opening in the drum, and other portions generally transverse to the direction of rotation of the rotary element and providing means for creating air turbulence within the drum for directing harvested material through the discharge opening.

4. For use with a harvester provided with a platform structure inclining upwardly and rearwardly from a lower front end portion adjacent the ground and having means for receiving harvested material: a harvesting attachment comprising, an elongated generally cylindrical drum positionable horizontally across the lower front end of the platform structure; means for connecting the drum to the platform structure; said drum having a material intake opening in a bottom portion thereof for providing communication between the interior of the drum and the material to be harvested and having a discharge opening separate from the intake opening and spaced circumferentially of the drum therefrom for communicating with the material-receiving means of the platform structure; a rotary element in the drum and rotatable about an axis extending axially of the drum; means within the drum operable by the rotary element and engageable through the material intake opening thereof with material to be harvested for collecting and delivering such material into the confines of the drum; and means within the drum operable by the rotary element including blower elements for discharging harvested material through the discharge opening in the drum to the material-receiving means of the platform structure.

5. For use with a harvester provided with a platform structure inclining upwardly and rearwardly from a lower front end portion adjacent the ground and having means for receiving harvested material: a harvesting attachment comprising, an elongated generally cylindrical drum positionable horizontally across the lower front end of the platform structure; means for connecting the drum to the platform structure; means providing a material intake opening within a bottom portion of the drum for communicating the drum with material to be harvested; means providing a discharge opening in a cylindrical wall of the drum; a discharge housing extending generally tangentially to the drum and communicating with the discharge opening for discharge to the material-receiving means of the platform structure; a rotary element axially within and journaled in the drum; means within the drum carried by the rotary element and engageable through the material intake opening thereof with material to be harvested for collecting and moving such material circumferentially of and within the confines of the drum; and means within the drum carried by the rotary element including blower elements for discharging harvested material through the discharge opening in the drum and through the discharge housing to the material-receiving means of the platform structure.

6. For use with a harvester having a platform structure and means for receiving harvested material: a harvesting attachment comprising, an elongated drum structure positionable horizontally across the platform structure adjacent the ground; means including a material intake opening in the bottom portion of the drum structure through which harvested material may be taken into the drum structure; discharge means for establishing communication of the interior of the drum structure with the material-receiving means of the platform structure; a shaft extending axially within the drum structure and journaled therein, means for driving the shaft, a cage structure including axially spaced spider elements constrained for rotation with the shaft, a plurality of rods circumferentially spaced about and carried by and between the spiders and paralleling the shaft, and a plurality of series of teeth swingably carried by the rods, one series on each rod, and extendible radially outwardly within the drum as the cage structure is rotated, said teeth having the end portions thereof that are remote from the rods constructed and arranged to harvest material through the intake opening of the drum structure, and at least certain of said teeth including portions proximate to the rods provided as relatively broad surfaces generally paralleling the rods and operable as means to engage the harvested material and deliver such material through the discharge opening to the material-receiving means of the platform structure.

7. The invention set forth in claim 6, in which: the broad-surfaced portions of the teeth in each series are normally in alinement lengthwise of the drum.

8. The invention set forth in claim 6, in which: each broad-surfaced portion extends through substantially one half the length of the tooth on which it is provided.

9. The invention set forth in claim 6, in which:

the harvesting end portion of each tooth includes a plurality of tines rigid with the tooth.

10. The invention set forth in claim 9, in which: the tines of each tooth are spaced apart transversely as respects the direction of rotation of the cage structure and the extent of spacing is within the limits of the width of the broad-surfaced portion of said tooth.

11. The invention set forth in claim 9, in which: the harvesting end portions of the tines are provided with tips of hardened metal.

12. A harvesting tooth for a harvesting attachment of the type described, comprising: an elongated body of relatively wide flat stock having one end provided with pivot means for connecting the tooth to a rod or shaft or the like, a portion of the body next adjacent said end being a fan portion, and the other end being split lengthwise of the body to provide a plurality of tines extendinng endwise of the elongated body from the fan portion.

13. The invention set forth in claim 12, in which: the split portions providing the tines are each disposed to lie in a plane normal to the plane of the fan portion.

14. A harvesting tooth for a harvesting attachment of the type described, comprising: an elongated body of relatively wide flat stock having one end provided with pivot means for connecting the tooth to a rod or shaft or the like, a portion of the body next adjacent said end being a fan portion, and the other end being provided with a tine of reduced width as respects the fan portion and extending endwise of such body from the fan portion.

15. The invention set forth in claim 14, in which: the portion providing the tine is twisted to lie in a plane at an angle to the plane of the fan portion.

16. A harvester, comprising: a rearwardly and upwardly inclined feeder; an elongated drum positioned horizontally across the lower, front end of the feeder; said drum having an intake opening in a bottom portion thereof through which material to be harvested may be taken into the drum and a discharge opening in the drum spaced circumferentially thereof from the intake opening and through which the material in the drum is dischargeable to the feeder; a rotary element journaled in the drum and extending axially thereof; means for driving the rotary element; and combined stripper and air-blast-generating means rotatable within the drum and driven by the rotary element for taking in material through the intake opening in the drum and discharging the material through the discharge opening to the feeder.

17. A harvester, comprising: a feeder; an elongated drum positioned adjacent the feeder; said drum having a crop intake opening for communicating between the interior of the drum and material to be harvested, air inlet opening means in the ends of the drum and a discharge opening spaced circumferentially from the crop inlet opening and communicating with the feeder; a rotary element journaled in the drum; means for driving the rotary element; and combined stripper and blower means operable within the drum and driven by the rotary element for taking in material through the crop intake opening in the drum and discharging the material through the discharge opening to the feeder.

18. In a harvester having a feeder adapted to travel over the ground; a grass and seed pick-up unit comprising an elongated drum having a bottom portion positioned in close proximity to the ground across the feeder and ahead of the feeder as respects the direction of travel of the feeder; said drum having a crop intake opening in the bottom portion thereof through which material to be harvested can enter, a material discharge opening spaced circumferentially of the drum from the crop inlet opening and directed rearwardly toward the feeder and also having air inlet openings at its ends; a rotary member in the drum and extending axially thereof, said rotary member being journaled for rotation about an axis extending axially of the drum; means for driving the rotary member; and combined stripper and air-blast-generating means carried by and rotatable within the drum with the rotary member to draw air inwardly through the air inlet openings and including elements engageable with material entering the intake opening of the drum, the direction of rotation of said means and the rotary member being such that the elements thereon sweep forwardly at the crop intake opening, as respects the direction of travel of the drum and feeder, and rearwardly at the discharge opening for taking material in through the crop intake opening and discharging said material rearwardly through the discharge opening to the feeder.

19. In a harvester advanceable over a ground course for harvesting the seed of grass on such course, a casing having a bottom intake opening for disposal in close proximity to the ground, said casing also including a curved front wall having a lower edge bordering a front edge of the opening and leading first forwardly and upwardly from said edge and then upwardly and rearwardly with a continuing portion thereof, means providing a discharge opening directed rearwardly from the continuing portion of said wall for the reception and discharge of material swept upwardly circumferentially thereof from the intake opening, a rear wall rearwardly of the intake opening, and end walls at the ends of the above recited walls; a carrier rotatable in the casing about an axis extending lengthwise of said walls; grass stripping flails pivoted on the carrier to swing radially outwardly therefrom about axes extending axially of the carrier pursuant to carrier rotation, said flails being mounted to sweep against such grass in registry with the intake opening while swung outwardly; and means operable to rotate the carrier in the direction to cause movement of the flails forwardly across the intake opening and then upwardly along said forward wall.

ROBERT W. FORT.

REFERENCES CITED

The following references are of record in the file of this patent:

UNITED STATES PATENTS

| Number | Name | Date |
| --- | --- | --- |
| 71,577 | Brown et al. | Dec. 3, 1867 |
| 198,801 | Hay | Jan. 1, 1878 |
| 691,846 | Dominy | Jan. 28, 1902 |
| 2,352,854 | Miller | July 4, 1944 |

FOREIGN PATENTS

| Number | Country | Date |
| --- | --- | --- |
| 211,445 | Bucher-Guyer (Sweden) | Dec. 2, 1940 |